United States Patent [19]

Hamagishi et al.

[11] Patent Number: 5,541,746
[45] Date of Patent: Jul. 30, 1996

[54] LIGHT SOURCE DEVICE FOR USE IN LIQUID CRYSTAL PROJECTORS

[75] Inventors: Goro Hamagishi, Toyonaka; Kenji Yamauchi, Kishiwada; Hideyuki Kanayama, Kadoma; Ryuhei Amano, Hirakata, all of Japan

[73] Assignee: Sanyo Electric Co., Ltd., Osaka, Japan

[21] Appl. No.: 531,971

[22] Filed: Oct. 10, 1995

Related U.S. Application Data

[63] Continuation of Ser. No. 99,564, Jul. 30, 1993, abandoned.

[30] Foreign Application Priority Data

| Aug. 19, 1992 | [JP] | Japan | 4-220318 |
| Dec. 18, 1992 | [JP] | Japan | 4-338728 |
| Mar. 17, 1993 | [JP] | Japan | 5-057171 |

[51] Int. Cl.⁶ .................................................. G02F 1/1335
[52] U.S. Cl. .............................. 359/49; 359/40; 359/70
[58] Field of Search ................... 359/49, 40, 41, 359/70

[56] References Cited

U.S. PATENT DOCUMENTS

| 4,722,593 | 2/1988 | Shimazaki | 350/336 |
| 4,735,495 | 4/1988 | Henkes | 350/345 |
| 5,121,137 | 6/1992 | Taki et al. | 346/108 |
| 5,142,387 | 8/1992 | Shimaka et al. | 359/49 |
| 5,150,138 | 9/1992 | Nakanishi et al. | 353/38 |
| 5,159,478 | 10/1992 | Akiyama et al. | 359/69 |

FOREIGN PATENT DOCUMENTS

| 0239007 | 9/1987 | European Pat. Off. | 359/49 |
| 3-196134 | 8/1991 | Japan . | |

OTHER PUBLICATIONS

Izumitani et al., *Machine Designing*, vol. 30, No. 4 (Apr. 1986), pp. 42–50 "Designing and application of a spherical glass lens for the use of optical disc and camera".

*Primary Examiner*—William L. Sikes
*Assistant Examiner*—Charles Miller
*Attorney, Agent, or Firm*—Nikaido, Marmelstein, Murray & Oram LLP

[57] ABSTRACT

A light source device for use in liquid crystal projectors which comprises a reflector oriented toward a liquid crystal panel and having a reflecting surface formed by a paraboloid or ellipsoid, and a light source disposed at the focal position of the reflector. A converter is disposed on an optical axis extending from the light source to the liquid crystal panel for converging light emanating from the light source and reflected from the reflector in accordance with the size of an image display portion of the panel. The reflecting surface of the reflector has a great focal distance so that the spreading angle of the reflected light is not greater than 8 deg.

5 Claims, 14 Drawing Sheets

FIG. 6A

| LENS SURFACE | RADIUS OF CURVATURE r (mm) | THICKNESS d (mm) | REFRACTIVE INDEX $n_d$ |
|---|---|---|---|
| I | −106.827 | 5 | 1.5163 |
| II | $\phi = \sim 18°$ : $r_1 = 31.395$<br>$\phi = 18° \sim 40°$ : $r_2 = 38.600$<br>$\phi = 40° \sim 60°$ : $r_3 = 48.000$ | | |

FIG. 6B

| LENS SURFACE | RADIUS OF CURVATURE r (mm) | THICKNESS d (mm) | REFRACTIVE INDEX $n_d$ |
|---|---|---|---|
| I | −106.827 | 5 | 1.5163 |
| II | $x = \dfrac{H^2/r}{1 + \{1 - (k+1)(H/r)^2\}^{1/2}}$ | | |

LIGHT SOURCE DEVICE FOR USE IN LIQUID CRYSTAL PROJECTORS

This application is a continuation division of application Ser. No. 08/099,564 filed Jul. 30, 1993, now abandoned.

FIELD OF THE INVENTION

The present invention relates to light source devices for use in liquid crystal projectors by which images displayed on a liquid crystal panel are projected on a screen on an enlarged scale.

BACKGROUND OF THE INVENTION

As shown in FIG. 12, conventional light source devices for use in liquid crystal projectors comprise a reflector 101 having a paraboloidal reflecting surface and an opening diameter D which is approximately equal to the size W of image display portion 104 of a liquid crystal panel 103. The light from a metal halide lamp or like light source 106 disposed inside the reflector 101 is converted by reflection nearly to parallel rays to irradiate the image display portion 104 of the liquid crystal panel 103.

Unexamined Japanese Patent Publication HEI 2-209093 proposes a liquid crystal projector which comprises a condenser lens disposed on one side of a liquid crystal panel, i.e., on the light source side, and a projection lens disposed on the other side of the panel, i.e., on the screen side, and in which the light passing through the liquid crystal panel is converged on the projection lens.

The above and other publications also disclose a technique wherein a microlens array is provided on the light incident side of the liquid crystal panel for converging the light incident on the panel in corresponding relation to the individual liquid crystal picture elements to improve the substantial opening ratio of the liquid crystal panel.

Further Unexamined Japanese Patent Publication HEI 4-127136 proposes a liquid crystal projector which comprises a light guide tube having a multiplicity of minute apertures for selectively passing therethrough only the vertically incident rays included in a bundle of rays incident on each minute aperture, whereby unnecessary scattering light from the light source is blocked.

On the other hand, Unexamined Japanese Patent Publication HEI 3-196134 proposes an illuminating device which includes a reflector comprising an ellipsoidal mirror and a spherical mirror in combination for guiding light from a light source to outside for efficient use.

With the conventional reflector, however, the metal halide lamp or like light source 106 is not a point light source but a line light source wherein the light-emitting arc is about 5 mm in length L, so that the light reflected from the reflector is not in the form of parallel rays but has a spreading angle θ' of about 10 to about 12 deg as indicated in solid lines or broken lines in FIG. 12.

With reference to FIG. 13, the liquid crystal panel 103 includes a liquid crystal material 110 enclosed in a space between two glass panels 107 and 108, and a black matrix 109 in the form of a lattice for preventing light from impinging on a TFT (Thin Film Transistor). One of the glass panels, 108, is provided over its outer surface with an array 111 of microlenses, and the surface of the microlens array 111 is covered with a glass substrate 112.

In the case where the light incident on the liquid crystal panel is parallel rays as indicated in solid lines in FIG. 13, the parallel rays are concentrated at the openings of the black matrix 109 by the action of the microlens array 111 to pass through the pixels of the liquid crystal material 110.

In actuality, however, the light reflected from the reflector 101 has a spreading angle since the light source 106 has the light emission length L as stated above, and the light is concentrated by the array 111 at deflected positions as indicated in broken lines and dot-and-dash lines in FIG. 13, partly impinging on the black matrix 109 and failing to pass through the liquid crystal material. This reduces the apparent opening ratio of the liquid crystal panel to a value lower than is expected.

Accordingly, if the spreading angle of the incident light on the microlens array 111 is within a certain range (generally 8 deg), the light concentrating effect of the array 111 can be expected, whereas if the spreading angle is greater, there arises the problem that the light concentrating action of the lens array 111 produces a reverse effect, failing to achieve an improved light utilization efficiency.

Further with the illuminating device of the above-mentioned publication HEI 3-196134, the reflector of ellipsoidal mirror has two focal positions, and a convex lens is disposed ahead of the second of these positions closer to the liquid crystal panel to obtain parallel rays. Accordingly, the optical path from the light source to the liquid crystal panel has a great length, consequently entailing the problem of making the illuminating device large-sized.

SUMMARY OF THE INVENTION

An object of the present invention is to provide a light source device for liquid crystal projectors wherein the spread of light reflected from the reflector is suppressed even if the light source has a length of light emission, enabling microlenses or the like to achieve the greatest possible light concentrating effect.

Another object of the present invention is to provide a light source device for use in liquid crystal projectors which is adapted to efficiently guide light from its light source to a liquid crystal panel.

The present invention provides a light source device for use in liquid crystal projectors which comprises a reflector disposed as oriented toward a liquid crystal panel and having a reflecting surface formed by a paraboloid, and a light source disposed at the focal position of the reflector. Disposed on an optical axis extending from the light source to the liquid crystal panel is a converter for converging light emanating from the light source and reflected from the reflector in accordance with the size of an image display portion of the liquid crystal panel. The reflecting surface of the reflector has a great focal distance so that the spreading angle of the reflected light is not greater than 8 deg.

The present invention provides another light source device which comprises a reflector having a reflecting surface formed by an ellipsoid, and a light source disposed at the focal position of the reflector. Provided on an optical axis extending from the light source to a liquid crystal panel is a concave lens for refracting light emanating from the light source and reflected from the reflector, toward an image display portion of the liquid crystal panel. The reflecting surface of the reflector has a great focal distance so that the spreading angle of the reflected light is not greater than 8 deg.

The present invention further provides another light source device which comprises a first reflector disposed as oriented toward a liquid crystal panel and having a reflecting surface formed by an ellipsoid, and a light source disposed at the focal position of the first reflector. Disposed as opposed to the first reflector is a second reflector having a reflecting surface which is formed by a spherical surface centered about the focal position. The second reflector is formed with an opening positioned on an optical axis extending from the light source to the liquid crystal panel. Disposed on the optical axis extending from the light source to the liquid crystal panel is a concave lens for refracting light emanating from the light source and reflected at the first reflector, toward an image display portion of the panel. The reflecting surface of the first reflector has a great focal distance so that the spreading angle of the reflected light is not greater than 8 deg.

With any of the above light source device, the focal distance of the reflecting surface of the reflector for reflecting the light from the light source is greater than in the prior art. With increasing focal distance, the distance between the light source and the reflector reflecting surface increases, relatively making the light source resemble a point light source more closely. When the spreading angle of the light emanating from the light source and reflected from the reflector reflecting surface is thus reduced to not greater than 8 deg, the light incident on the liquid crystal panel substantially becomes parallel rays. This enables microlenses or the like to produce a light concentrating effect to the greatest possible extent to increase the apparent opening ratio of the liquid crystal panel.

Further with the light source device comprising the first reflector with an ellipsoid and the second reflector with a spherical surface, the reflecting surface of the second reflector can be made larger by diminishing the concave lens to the greatest possible extent, whereby the light of the light source can be utilized more efficiently.

BRIEF DESCRIPTION OF THE DRAWINGS

FIG. 6A is a diagram showing the construction of an aspherical lens for use in the fifth embodiment;

FIG. 6B is a diagram showing the construction of another aspherical lens for use in the fifth embodiment;

DETAILED DESCRIPTION OF EMBODIMENTS

Light source devices embodying the present invention for use in liquid crystal projectors will be described below in detail with reference to the drawings.

First Embodiment

Figure 1:
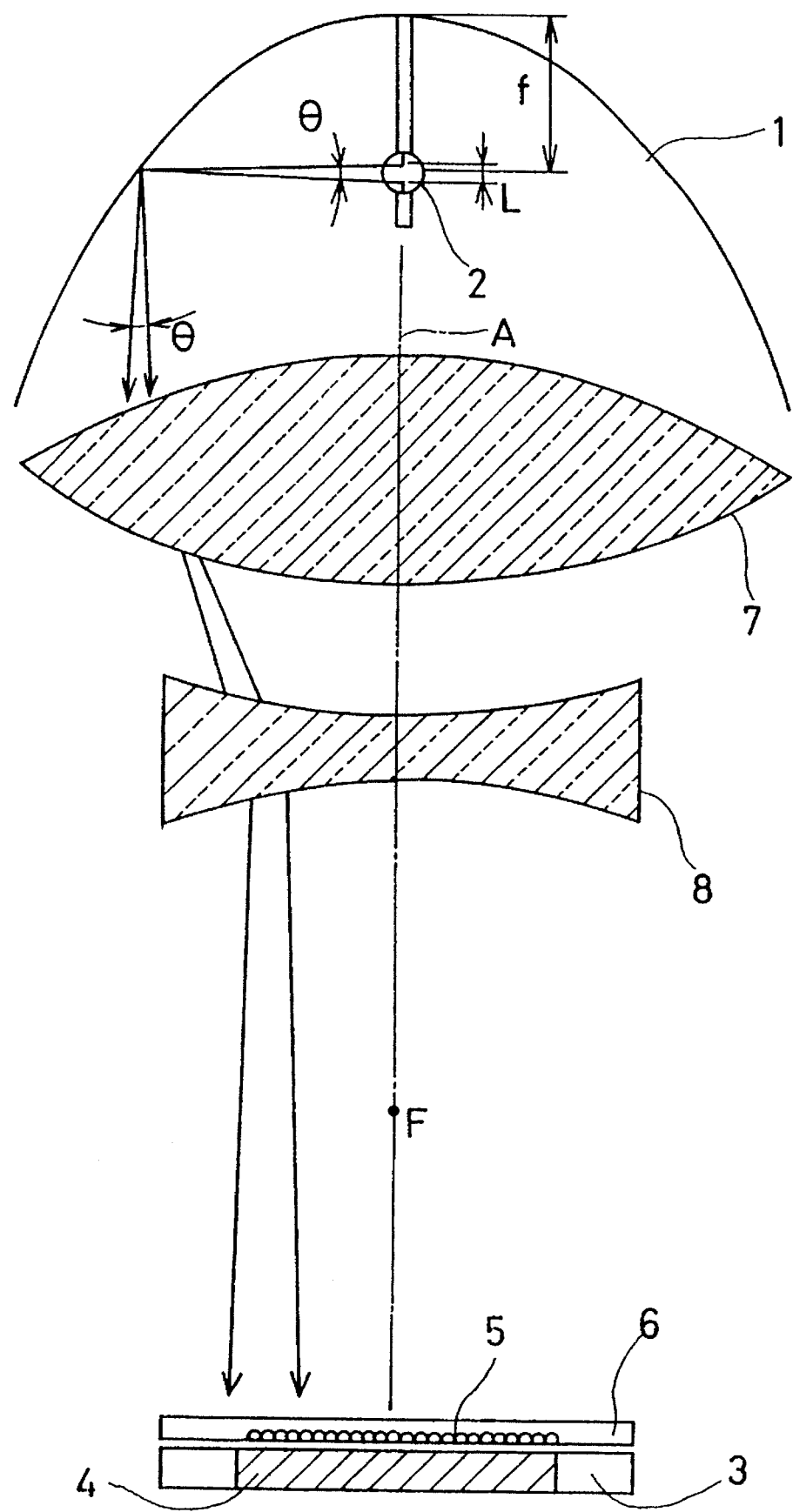
FIG. 1 is a sectional view showing the arrangement of optical components of a first embodiment of the invention, i.e., a light source device for use in liquid crystal projectors.

FIG. 1 shows a light source device for use in liquid crystal projectors, which comprises a reflector 1 disposed as oriented toward a liquid crystal panel 3 having an image display portion 4. The reflector 1 has an opening diameter which is sufficiently larger than the panel 3. The reflector 1 has an inner surface provided by a paraboloidal mirror. A light source 2 comprising a metal halide lamp is disposed at the position of focus of the reflector 1. The reflector 1 has a focal distance f which is made sufficiently larger than the arc length L of the light source 2 in corresponding relation with the length L to reduce the spreading angle θ of light emanating from the light source 2 and reflected from the reflector 1 to not greater than 8 deg.

To converge the light emanating from the light source 2 and reflected from the reflector 1 on the image display portion 4 of the liquid crystal panel 3, an optical axis A extending from the light source 2 to the panel 3 has arranged thereon a convex lens 7 close to the opening of the reflector 1 and having an aperture approximately equal to the opening diameter of the reflector 1, and a concave lens 8 positioned between the convex lens 7 and the panel 3. The convex lens 7 and the concave lens 8 constitute a converter.

The convex lens 7 and the concave lens 8 each have a focal point at the same position F. Accordingly, the light reflected from the reflector 1 is concentrated toward the focal position F by the convex lens 7 and thereafter made into parallel rays by the concave lens 8.

Figure 2:
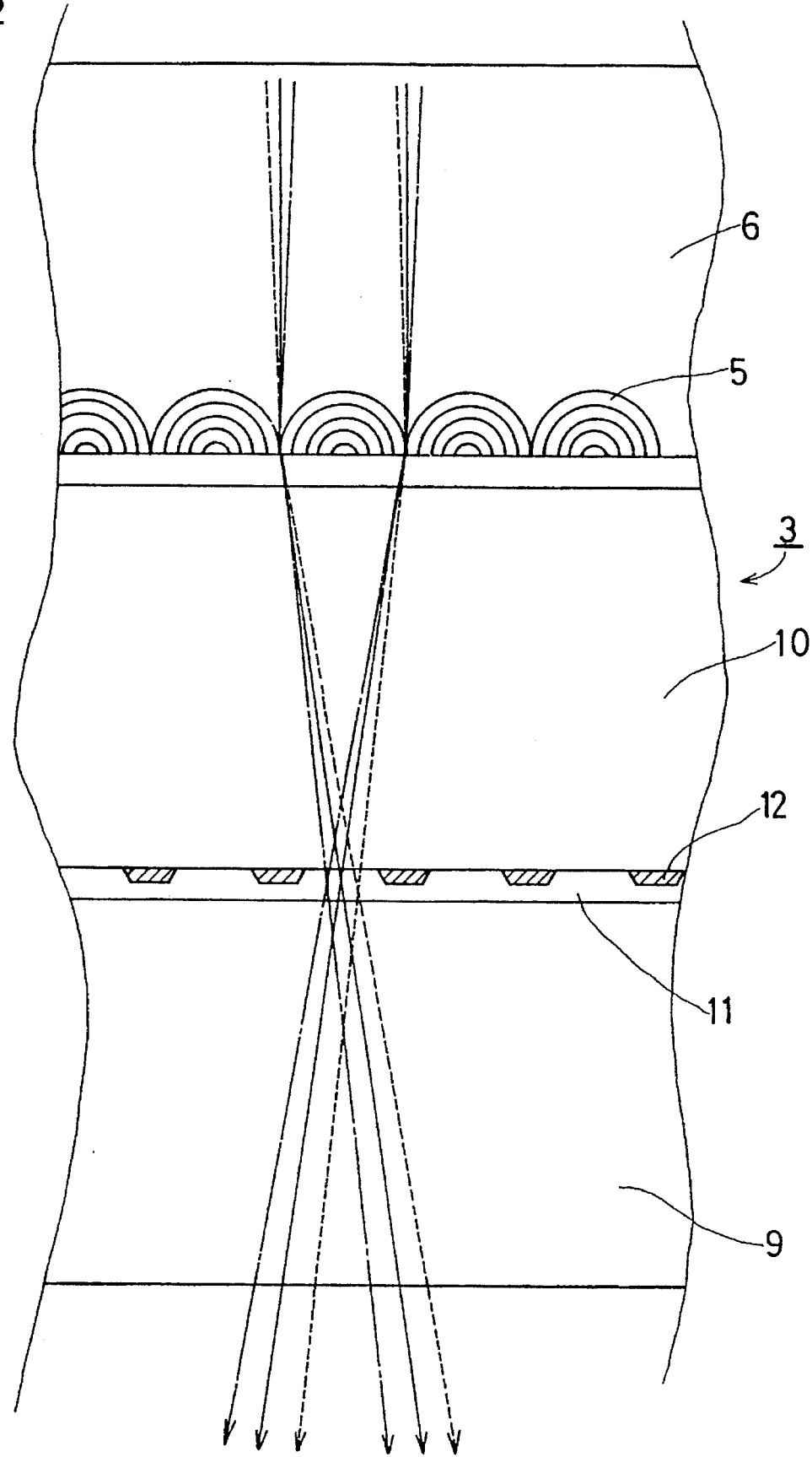
FIG. 2 is a sectional view of a liquid crystal panel to show a path of travel of light emanating from a light source.

As shown in FIG. 2, the liquid crystal panel 3 has a liquid crystal material 11 enclosed in a space between two glass panels 9, 10, and a black matrix 12 in the form of a lattice. One of the glass panels, 10, is provided on its outer surface with a microlens array 5, and the surface of the array 5 is covered with a glass substrate 6. The pitch of lattice bars of the black matrix 12 is about 100 micrometers.

The section of the paraboloidal mirror of the reflector 1 is represented by a parabola, which is expressed by the equation $y^2=4fx$, so that for example, the spreading angle θ of light emitted by the light source 2 perpendicular to the optical axis A as shown in FIG. 1 and the arc length L of the light source 2 have the following geometrical relation therebetween.

$$\theta = 2\tan^{-1}(L/4f)$$

Accordingly, to suppress the spreading angle θ to not greater than 8 deg requires the following relation between the focal distance f and the arc length L.

$$f > 3.58L$$

Thus, when L=5 mm, the focal distance f should be greater than 17.9 mm.

In the construction described, an increase in the distance between the light source 2 and the reflector 1 makes the light source 2 relatively resemble a point light source, whereby the spreading angle θ of the reflected light due to the arc length of the light source 2 can be suppressed to not greater than 8 deg, preferably to about 4 deg.

The reflected light having its spreading angle θ thus suppressed to about 4 deg passes through the convex lens 7 and the concave lens 8, is thereby concentrated and thereafter impinges on the microlens array 5 as shown in FIG. 2 while retaining the same spreading angle θ. The incident light has its spreading angle suppressed to about 4 deg, is therefore concentrated by the microlens array 5 without being greatly deflected and entirely enters the openings of the liquid crystal panel 3.

Thus, the light emanating from the light source 2 has its spreading angle θ reduced according to the present embodiment, consequently permitting the microlenses to produce an enhanced light concentrating effect, giving an improved substantial opening ratio to the liquid crystal panel and making it possible to design a brighter liquid crystal projector.

Although the light from the light source 2 is converted to parallel rays by the reflector 1 with the present embodiment, this is not limitative. The light from the light source may be slightly concentrated by the reflector 1 or by the combination of the reflector 1 and a condenser before incidence on the liquid crystal panel, whereby an increased amount of light can be led through the projection lens. The same advantage as described above can be expected also in this case.

Second Embodiment

Figure 3:
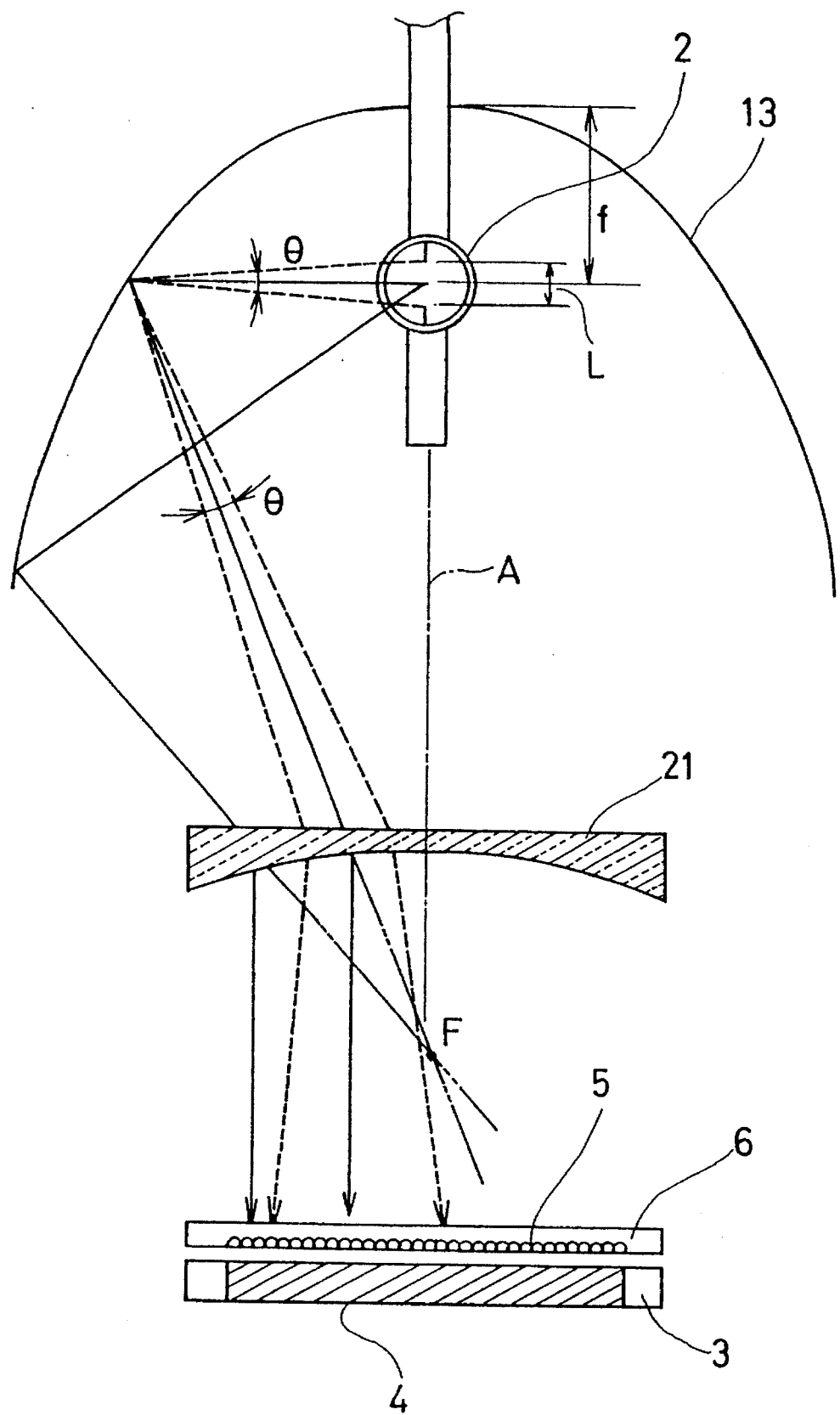
FIG. 3 is a sectional view showing the arrangement of optical components of a second embodiment.

FIG. 3 shows a light source device which includes a reflector 13 comprising an ellipsoidal mirror and a light source 2 disposed at the position of focus of the reflector 13. Throughout FIGS. 1 to 3, like parts are designated by like reference numerals and will not be described in detail repeatedly.

The reflecting surface of the reflector 13 is formed by an ellipsoid which is sufficiently small in the eccentricity of the ellipse thereof. Accordingly, the illustrated focal distance f is made sufficiently greater than the arc length L of the light source 2 in corresponding relation with the length, and the light reflected from the reflector 13 has its spreading angle θ suppressed to not greater than 8 deg.

A plano-concave lens 21 for converting the reflected light from the reflector 13 to parallel rays is disposed on an optical axis A extending from the light source 2 to a liquid crystal panel 3. The plano-concave lens 21 has an aperture equivalent to the size of the image display portion 4 of the panel 3 and is so positioned that the focal position F thereof is in coincidence with the second of two foci of the ellipsoid of the reflector 13, the second focus being closer to the panel 3.

The section of the ellipsoidal mirror of the reflector 13 is represented by an ellipse, which is expressed by the equation $x^2/a^2 + y^2/b^2 = 1$ where a an b are the distances from the center of the ellipse to the two top points thereof, so that for example, the spreading angle θ of light emitted by the light source 2 perpendicular to the optical axis A as shown in FIG. 3 and the arc length L of the light source 2 have the following geometrical relation therebetween.

$$\theta = 2\tan^{-1}(aL/2b^2)$$
$$f = a - \sqrt{a^2 + b^2}$$

Accordingly, the limit focal distance is calculated which gives a spreading angle θ of 8 deg, to use an ellipsoidal mirror having a focal distance which is sufficiently greater than the calculated value.

This gives a sufficiently great distance between the light source 2 and the reflector 13, whereby the spreading angle θ of the reflected light due to the arc length of the light source 2 can be reduced to not greater than 8 deg, preferably to about 4 deg.

The reflected light having its spreading angle θ thus suppressed to about 4 deg passes through the plano-concave lens 21, is thereby converted to substantially parallel rays and thereafter impinges on the microlens array 5. The incident light has its spreading angle suppressed to about 4 deg, is therefore concentrated by the microlens array 5 without being greatly deflected and entirely enters the openings of the liquid crystal panel.

Thus, with the second embodiment as in the first embodiment, the microlenses exhibit an enhanced light concentrating effect, giving an improved substantial opening ratio to the liquid crystal panel.

Third Embodiment

Figure 4:
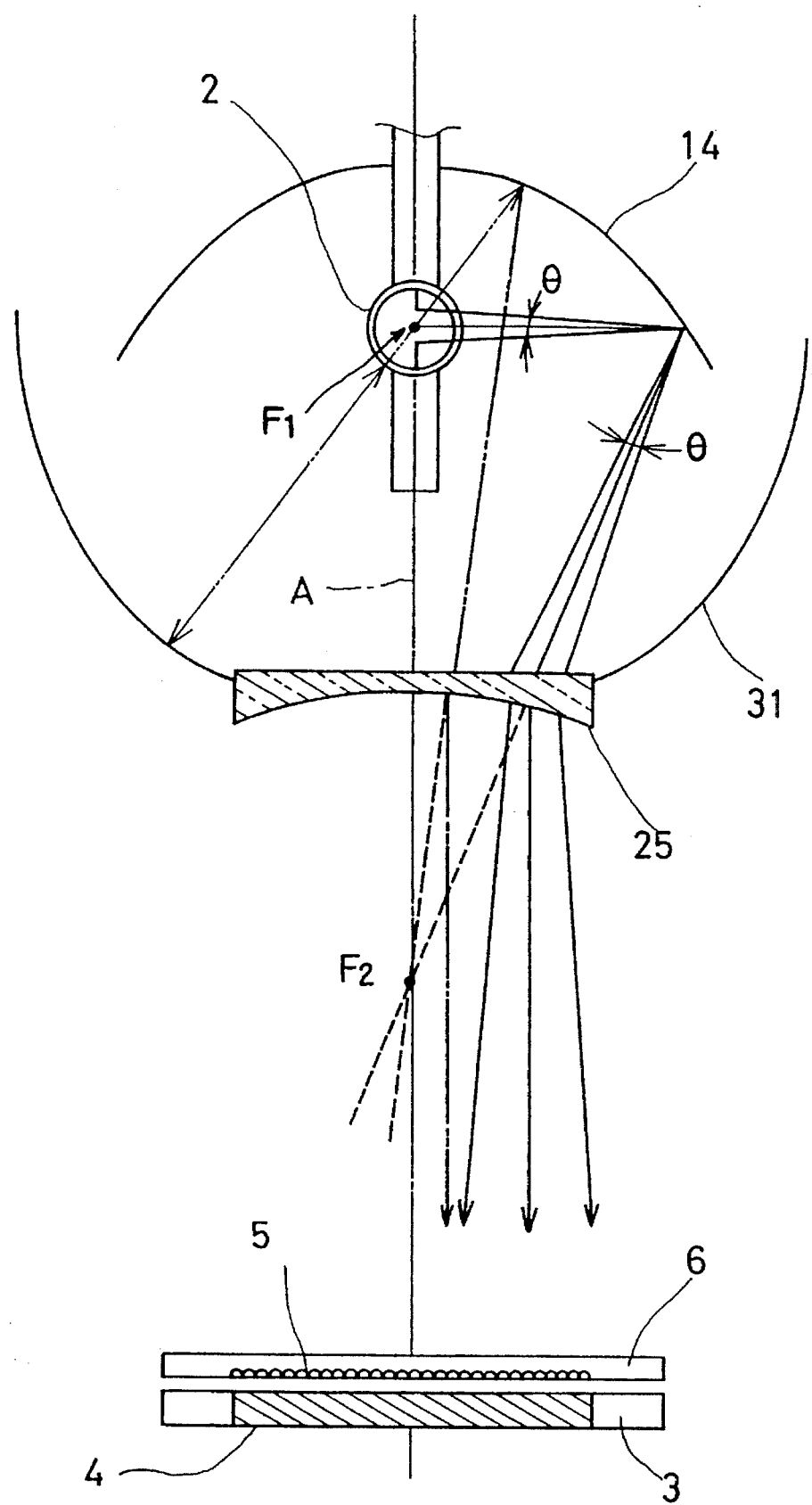
FIG. 4 is a sectional view showing the arrangement of optical components of a third embodiment.

FIG. 4 shows a light source device, which includes a first reflector 14 and a second reflector 31 arranged as opposed to each other and comprising an ellipsoidal mirror and a spherical mirror, respectively. A light source 2 is disposed at the focal position F1 of the first reflector 14. The second reflector 31 is so positioned that the center of its spherical surface is in coincidence with the focal position F1.

The first reflector 14 has the same construction as the reflector of the second embodiment. On the other hand, the second reflector 31 has a rectangular opening formed on an optical axis A extending from the light source 2 to a liquid crystal panel 3 and equivalent in size to the image display portion 4 of the panel 3. A plano-concave lens 25 is disposed in the opening. The plano-concave lens 25 is so disposed that the position of focus thereof is in coincidence with the position F2 of the second of two foci of the ellipsoid forming the reflecting surface of the first reflector 14, the second focal position F2 being closer to the liquid crystal panel.

The light emanating from the light source 2 and reflected from the first reflector 14 can be utilized with an improved efficiency as in the second embodiment.

With the light source devices according to the first and second embodiments, the light emanating forward from the light source 2 and advancing toward the liquid panel without being reflected from the reflector is not parallel rays, so that the opening diameter of the reflector is increased to the greatest possible extent so as to obtain an increased proportion of parallel rays. However, if the opening diameter is increased excessively, the light source device becomes large.

With the present embodiment, in contrast, the light emitted forward by the light source 2 returns toward the light source 2 upon being reflected at the second reflector 31 as indicated in a dot-and-dash line in FIG. 4 and is further reflected at the first reflector 14. The light source device can therefore be given a compact construction without entailing a reduction in the light utilization efficiency.

Further with the present embodiment, the light reflected from the first reflector 14 is converted to parallel rays by the plano-concave lens 25 provided at the opening of the second reflector 31. The length of optical path can therefore be shorter than in the case where a convex lens is disposed, for example, in front of the second focal position F2, closer to the panel, of the first reflector to convert the light to parallel rays. Thus, the arrangement is suitable for compacting the light source device.

A condenser or the like is also usable in the present embodiment for causing slightly concentrated light to impinge on the liquid crystal panel. The same advantage as described above is also available in this case.

Fourth Embodiment

Figure 5:
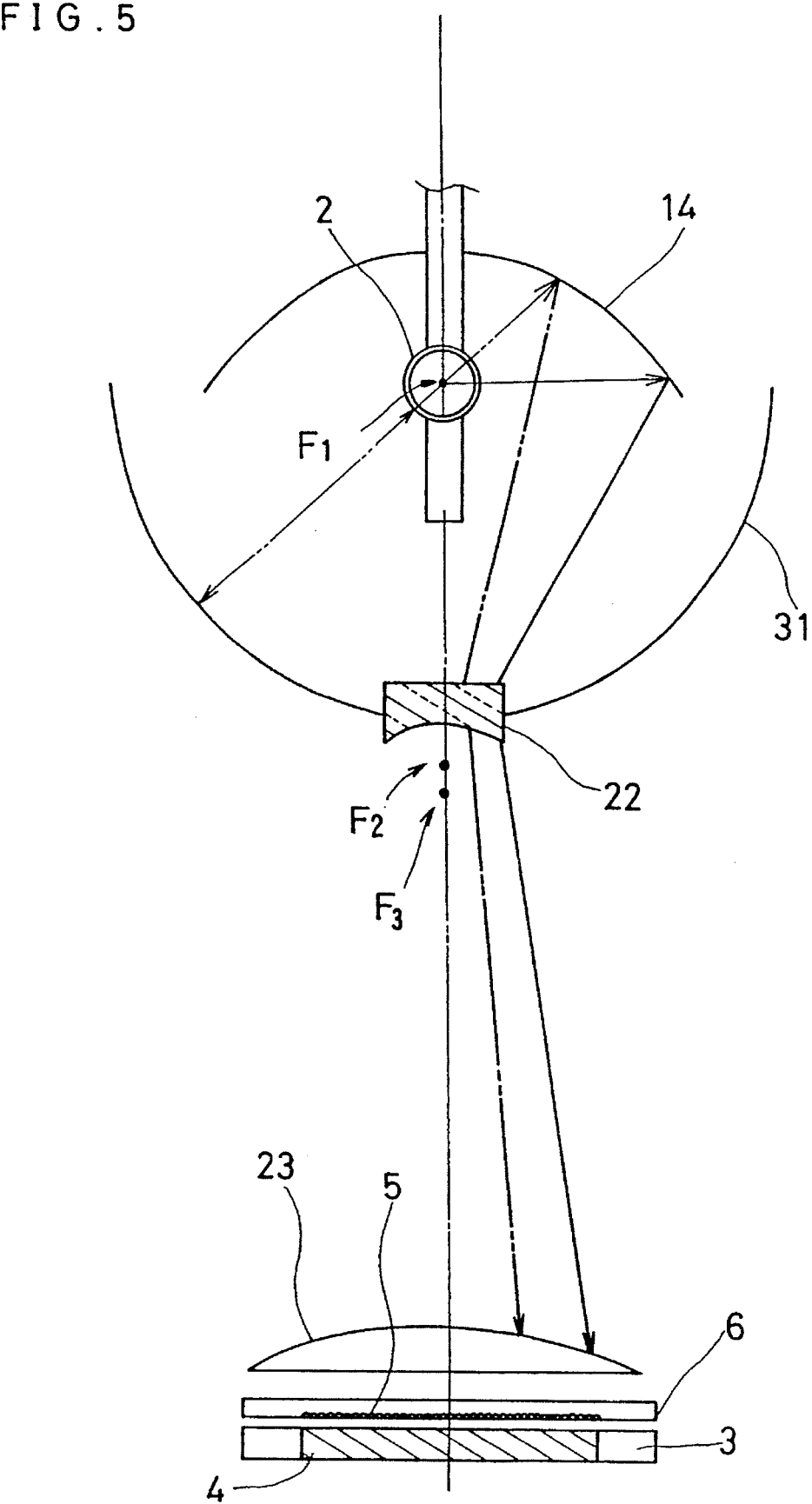
FIG. 5 is a sectional view showing the optical layout of a fourth embodiment.

FIG. 5 shows a light source corresponding to the third embodiment wherein the plano-concave lens is reduced in size to increase the reflection area of the second reflector.

Stated more specifically, the second reflector 31 has an opening which is sufficiently smaller than the display portion 4 of the liquid crystal panel 3, and a plano-concave lens 22 of decreased aperture is provided in the opening. The lens 22 has a focal position F3 which is closer to the liquid crystal panel than the second focal position F2, closer to the panel, of the ellipsoid forming the reflecting surface of the first reflector 14.

A plano-convex lens 23 is interposed between the plano-concave lens 22 and the panel 3 for converting light emanating in a spreading form from the lens 22 to parallel rays.

With this light source device, the light advancing forward without being reflected from the first reflector 14 is predominantly reflected at the second reflector 31 to achieve an improved light utilization efficiency even if the first reflector 14 is made smaller.

Fifth Embodiment

The fourth embodiment involves limitations to the reduction in the size of the plano-concave lens 22 due to the problem of aberrations of the lens (especially spherical aberration).

Figure 6:
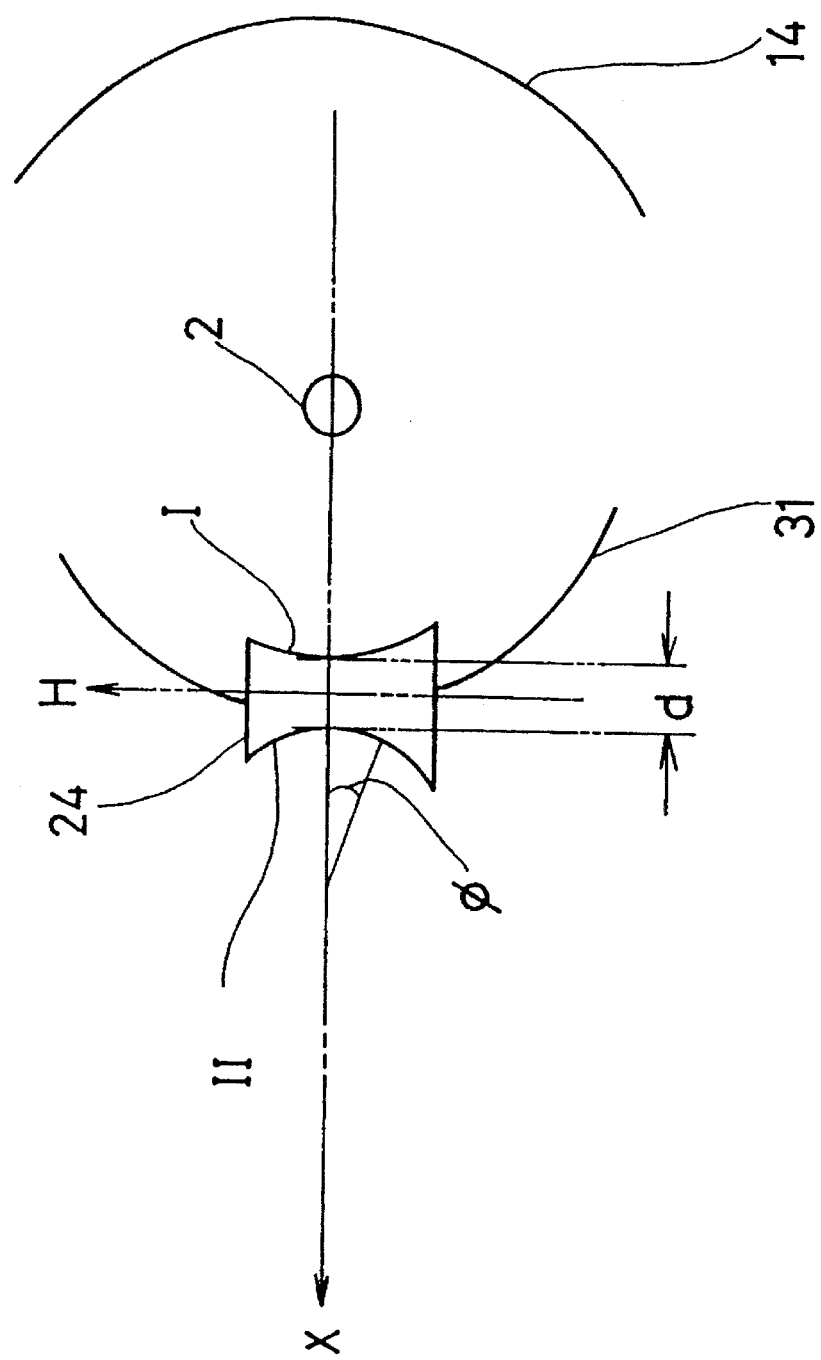
FIG. 6 is a sectional view showing the optical layout of a fifth embodiment.

With the light source device shown in FIG. 6, therefore, the plano-concave lens 22 having a single focus is replaced by a double-concave lens 24 one surface of which is formed by a multi-focus curved surface or aspherical surface.

FIG. 6A shows a double-concave lens which has on the light source side a lens surface I which is spherical and on the panel side a lens surface II which is in the form of a multi-focus curved surface formed by three radii of curvature. The angle $\phi$ given in FIG. 6A is an angle X-axis in FIG. 6 makes with a straight line extending from the center of curvature on X-axis to a point on the lens surface.

FIG. 6B shows a double-concave lens having on the light source side a lens surface I which is spherical and on the panel side a lens surface II which is in the form of a multi-focus curved surface expressed by the functional equation given in FIG. 6B. In this equation, X is a coordinate on the optical axis (direction of advance of light is positive), H is a coordinate in a direction perpendicular to the optical axis, r is the radius of basic spherical surface (paraxial radius of curvature) and k is a cone constant. In the present case, $k = -2.116173$, and $r = 31.395$.

The use of the double-concave lens 24 having the multi-focus curved surface or aspherical surface diminishes the spread of light at the periphery of the plano-concave lens 22 due to aberrations, with the result that the light passing through the double-concave lens 24 effectively reaches the liquid crystal panel 3.

The double-concave lens 24 with such a multi-focus curved surface or aspherical surface is usable also in the third embodiment shown in FIG. 4 to reduce aberrations.

Sixth Embodiment

Figure 7:
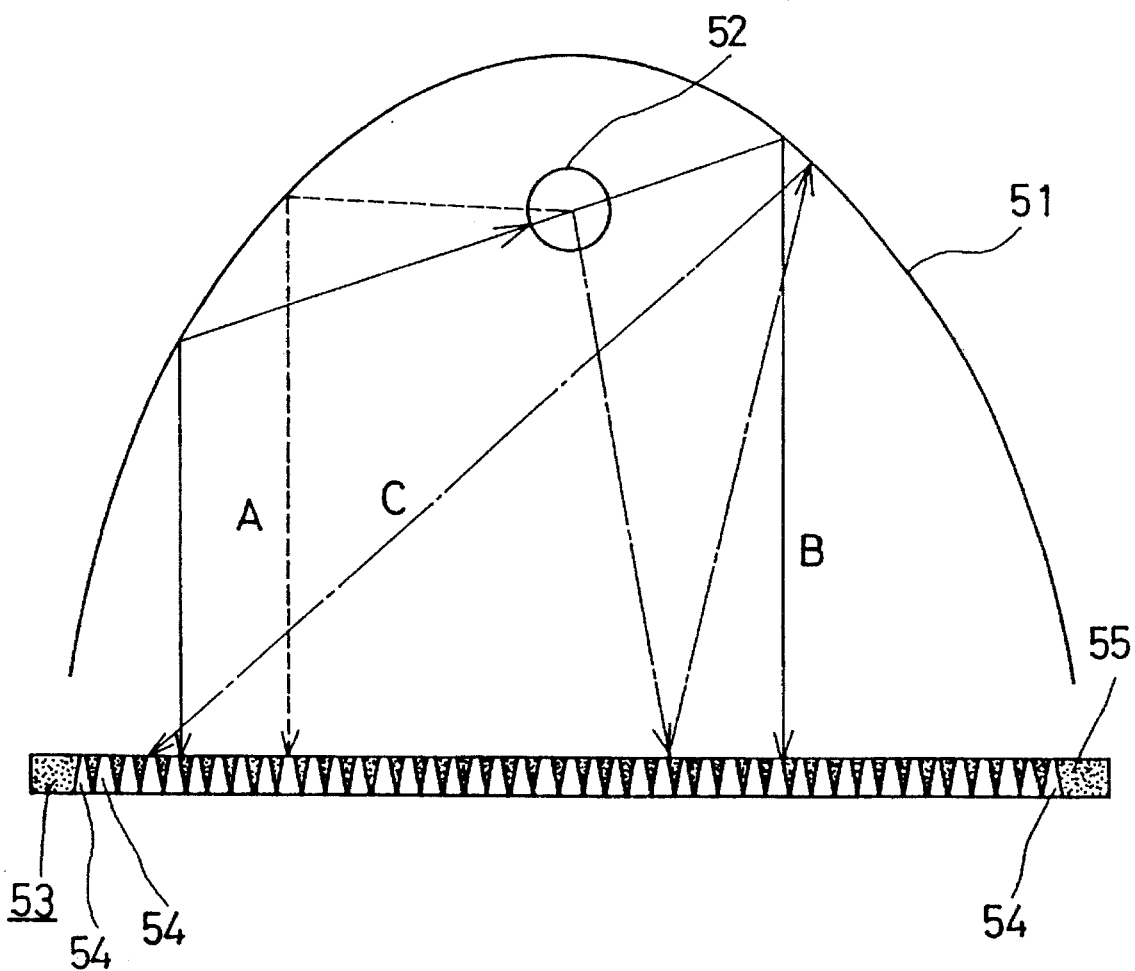
FIG. 7 is a sectional view showing the optical layout of a sixth embodiment.

FIG. 7 shows a light source device which comprises a reflector 51 having a reflecting surface formed by a paraboloidal mirror, a light source 52 disposed at the position of focus of the reflector 51, and an optical plate 53 provided at the opening of the reflector 51.

Figure 8:
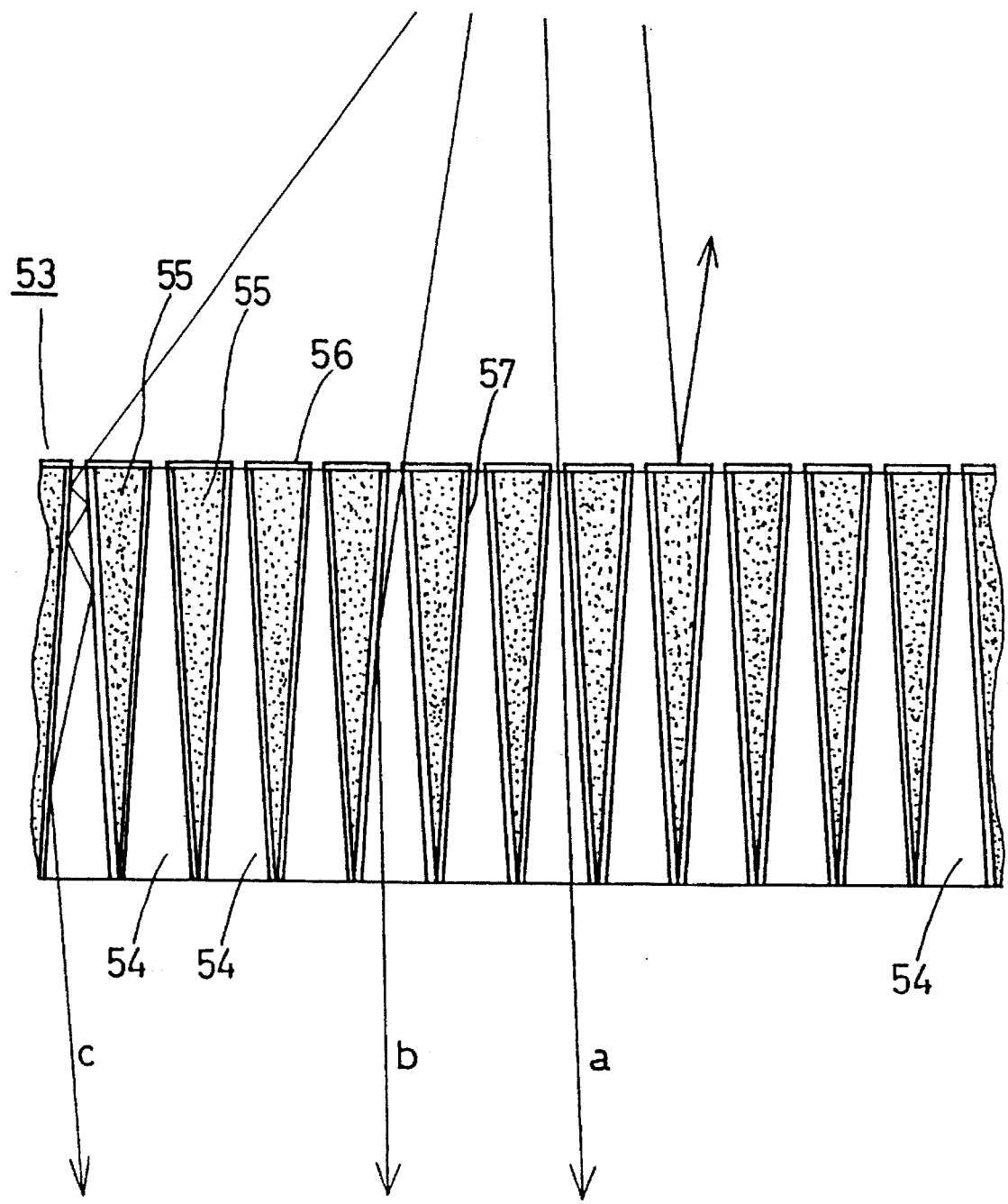
FIG. 8 is an enlarged sectional view of an optical plate included in the sixth embodiment.

With reference to FIG. 8, the optical plate 53 comprises minute glass pipes 54 arranged regularly and fixedly connected to one another by a support structure 55.

The glass pipe 54 has a diameter increasing along the direction of advance of light (from above downward in the drawings concerned). The pipe has the smallest diameter at a light inlet (upper opening in the illustrations) and the largest diameter at a light outlet.

Figure 9:
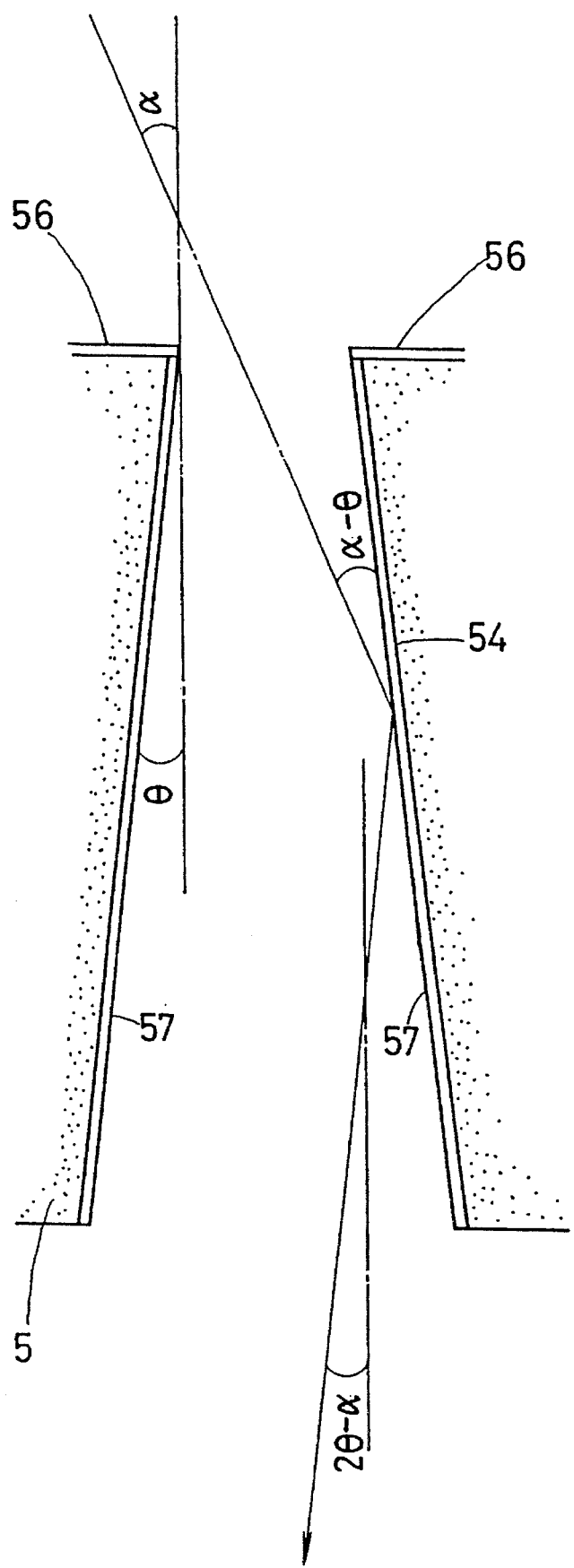
FIG. 9 is an enlarged sectional view of a glass pipe included in the sixth embodiment.

As shown in FIG. 9, the surface (upper surface in the drawing) of the optical plate 53 on the light incident side and the inner periphery of each glass pipe 54 are coated with a substance, such as aluminum, having a high reflectance to provide light reflecting surfaces 56, 57.

With reference to FIG. 7, the light emergent from the light source 52 is reflected at the reflector 51 as indicated in a broken line A and is thereafter incident on the optical plate 53, or the light impinges directly on the plate 53. The incident light partly enters the glass pipe 54. Further a major portion of the remainder of the light is reflected at the reflecting surface 56 on the plate 53, returned toward the light source 52 and repeatedly reflected at the reflecting surface 56 and the reflector 51 as indicated in a solid line B or dot-and-dash line C to eventually enter the glass pipe 54.

With reference to FIG. 8, of the light entering the glass pipe 54, a portion thereof incident axially of the pipe 54 (indicated in a solid line a) passes as it is through the pipe 54, while another portion of the light having an angle greater than the angle of inclination of the glass pipe 54 (solid line b or c) is reflected at the inner reflecting surface 57 of the pipe once or a plurality of times and thereafter emerges from the pipe 54.

A description will not be given of the optical path of the light reflected at the reflecting surface 57 of the glass pipe 54 whole inner periphery has an inclination θ as shown in FIG. 9. Suppose light having an inclination $\alpha$ ($\alpha > \theta$) with respect to the central axis of the pipe enters the pipe 54, is reflected at the inner reflecting surface 57 of the glass pipe 54 and thereafter emerges from the pipe with an angle of inclination $(2\theta - \alpha)$. At this time, there is the relation of $2\theta - \alpha < \alpha$, so that the light emergent from the glass pipe has a smaller inclination than the incident light. Thus, the direction of advance becomes closer to a direction parallel to the pipe axis. The same principle is also true of the case wherein light is reflected a plurality of times by the inner surface of the glass pipe 54, with the result that the light emergent from the pipe approaches the direction parallel to the pipe axis. Accordingly, the parallelism of emergent rays can be improved by optimizing the length and inclination of the glass pipe 54.

When a liquid crystal projector comprising the light source device of the embodiment is provided with an array of microlenses in corresponding relation with the respective pixels of the liquid crystal panel on the light incident side of the panel, the incident rays have improved parallelism as shown in FIG. 2, so that the light incident on the lens array 5 is concentrated at the respective openings of the panel 3, i.e., on the pixels. This improves the substantial opening ratio of the liquid crystal panel 3, affording bright images.

Seventh Embodiment

Figure 10:
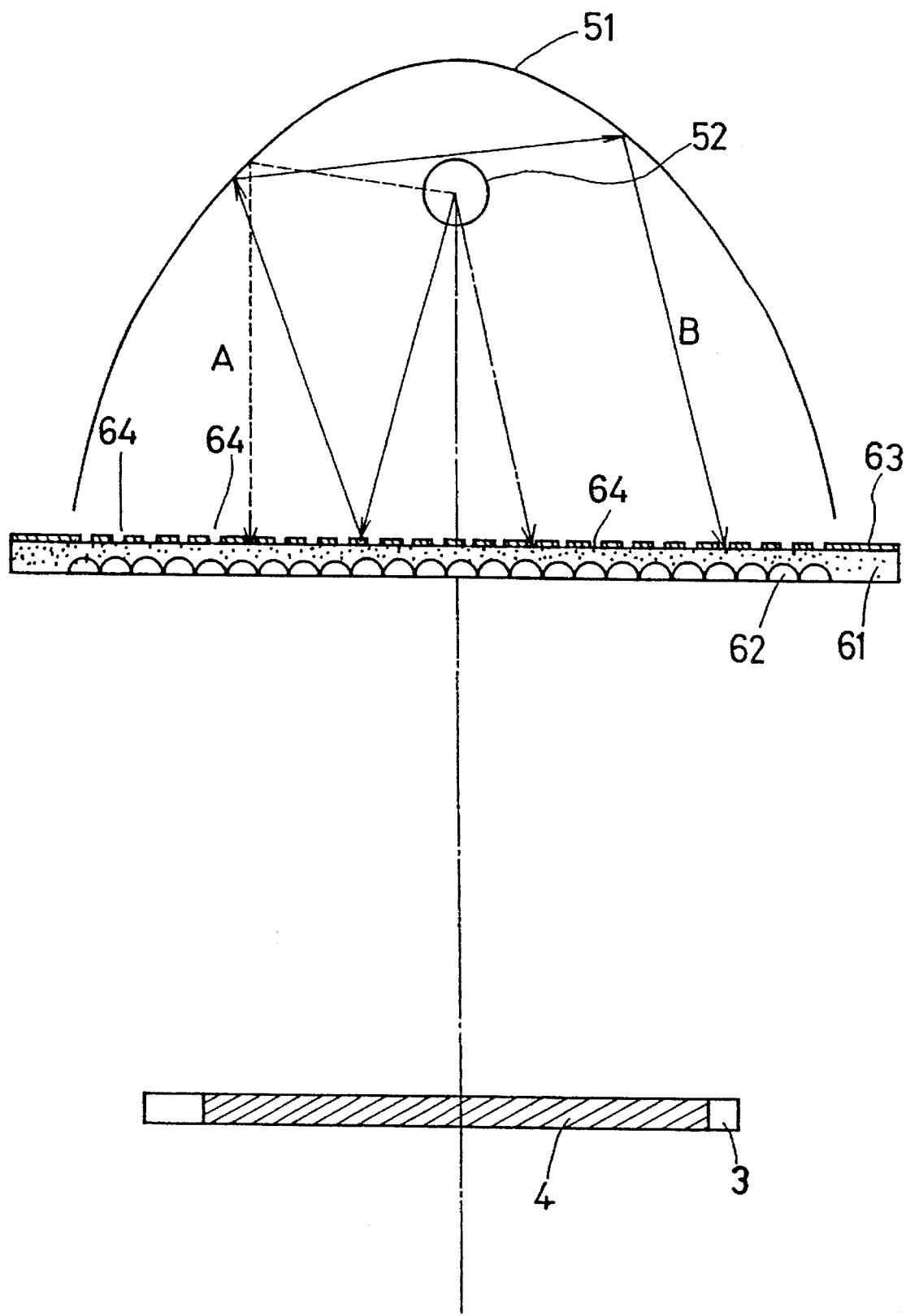
FIG. 10 is a sectional view showing the optical layout of a seventh embodiment.
Figure 11:
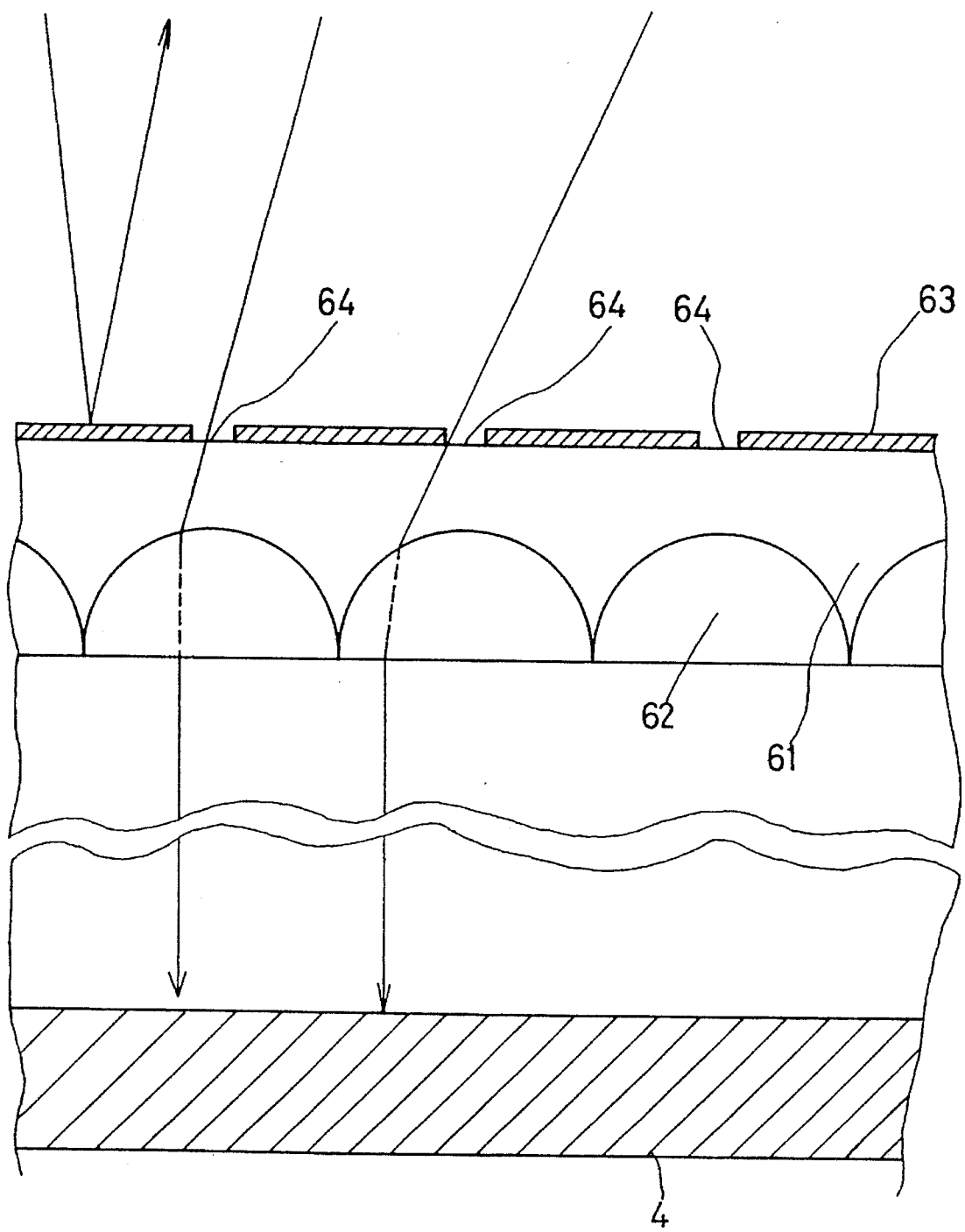
FIG. 11 is an enlarged fragmentary view in section of the seventh embodiment.
Figure 12:
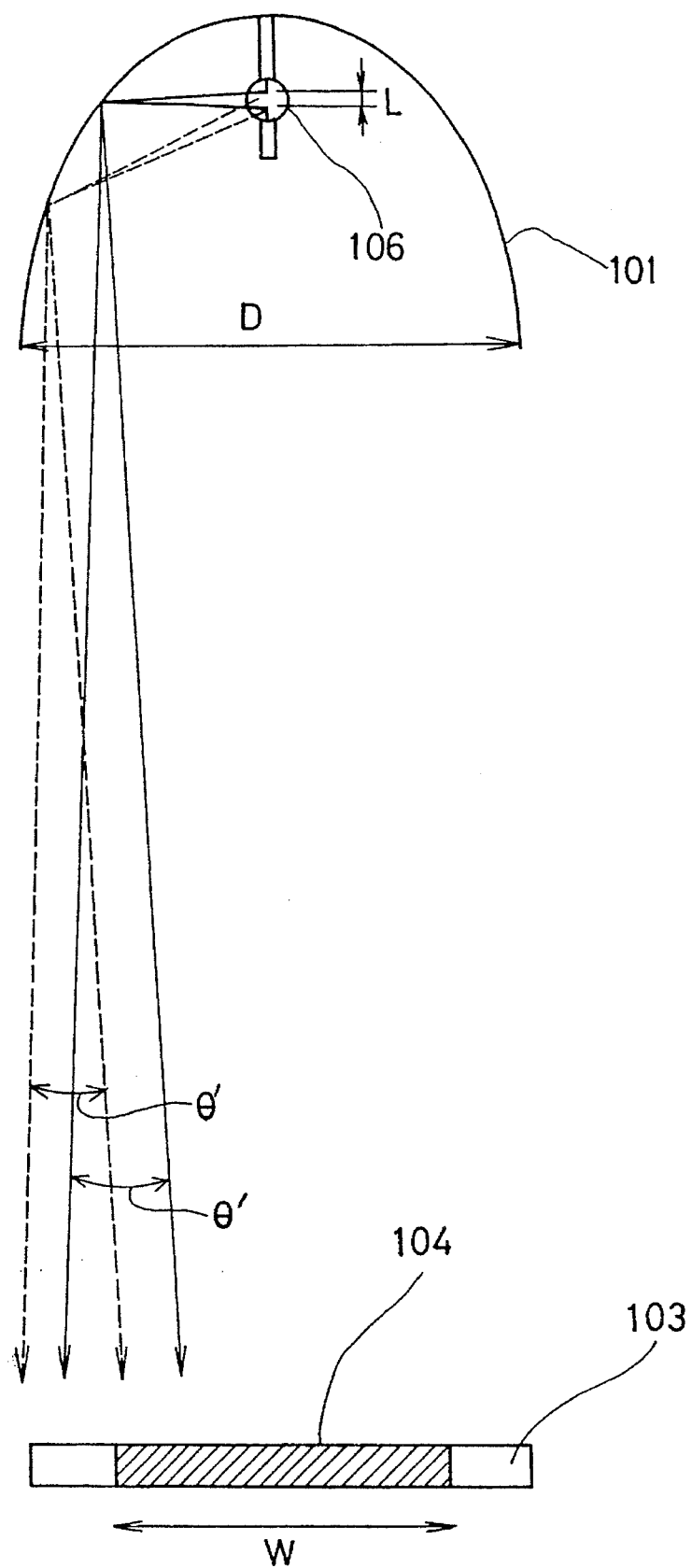
FIG. 12 is a sectional view showing a conventional light source device.
Figure 13:
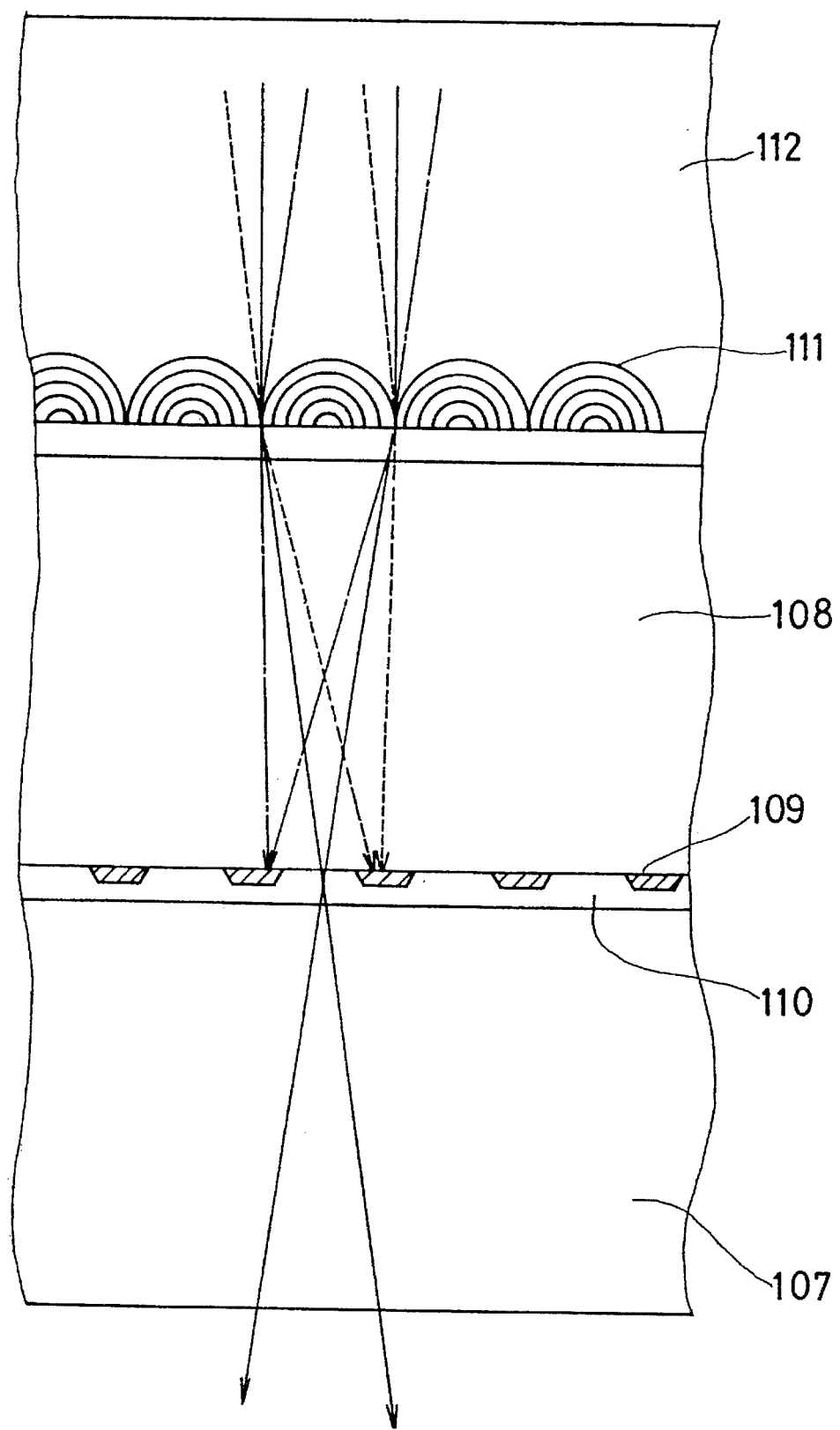
FIG. 13 is a sectional view of a liquid crystal panel showing optical paths in the conventional device.

FIGS. 10 and 11 show a light source device which comprises a reflector 51 having a paraboloidal mirror, a light source 52 at the focal position of the reflector 51 and an optical plate 61 disposed at an opening of the reflector 51.

The reflector 51 has the same construction as in the sixth embodiment. The optical plate 61 has a multiplicity of microlenses 62 arranged on the surface thereof opposed to a liquid crystal panel 3, a light reflecting surface 63 formed on the other surface closer to the light source 52 and made of a substance, such as aluminum, having a high reflectance, and a multiplicity of light passing windows 64 formed at the position of foci of the respective microlenses.

The light emanating from the light source 52 is reflected at the reflector 51 as indicated in a broken line A and thereafter incident on the optical plate 61, or impinges directly on the plate 61. A portion of the incident light passes through the windows 64. A major portion of the remainder of the light is reflected at the reflecting surface 63 on the optical plate 61, returned toward the light source 52 and repeatedly reflected at the surface 63 and the reflector 51 as indicated in a solid line B to eventually pass through the windows 64.

Since the light passing windows 64 are at the focal positions of the microlenses 62, the light passing through the windows 64 is converted by the lenses 62 to parallel rays as shown in FIG. 11 and emerges toward the image display portion 4 of the liquid crystal panel.

In the case where a liquid crystal projector comprising the above light source device is provided on the light incident side of the liquid crystal panel 3 with an array of microlenses (not shown) in corresponding relation with the respective pixels of the panel 3, the incident rays on the array have improved parallelism as stated above, so that the light incident on the array is entirely concentrated at the openings of the panel 3. This improves the substantial opening ratio of the liquid crystal panel 3.

The foregoing description of the embodiments is intended to illustrate the present invention and should not be construed as limiting the invention as defined in the appended claims or reducing the scope thereof. Furthermore, the components of the present device are not limited to those of the embodiments in construction but can of course be modified variously by one skilled in the art without departing from the spirit of the invention set forth in the claims.

What is claimed is:

1. A light source device for use in a liquid crystal projector comprising:

a first reflector oriented toward a liquid crystal panel and having a reflecting surface formed by an ellipsoid, a light source disposed at a focal position of the first reflector, a second reflector opposed to the first reflector and having a reflecting surface formed by a spherical surface centered about the focal position, the second reflector having an opening on an optical axis extending from the light source and reflected from the first reflector, toward an image display portion of the liquid crystal panel, a concave lens disposed at the opening of the second reflector on the optical axis for refracting light emanating from the light source and reflected from the first reflector, toward an image display portion of the liquid crystal panels, and the concave lens having an aperture approximately equivalent to the size of the image display portion of the liquid crystal panel and being so disposed that the concave lens is positioned between the light source and the position of a second focus, closer to the liquid crystal panel, of the ellipsoid forming the reflecting surface of the first reflectors, and the focal position of the concave lens is in coincidence with the second focus of the first reflector.

2. A light source device as defined in claim 1 wherein the concave lens has at least one surface formed by a multi-focus curved surface or an aspherical surface to suppress spread of light due to an aberration of the lens.

3. A light source device for use in a liquid crystal projector comprising:

a first reflector oriented toward a liquid crystal panel and having a reflecting surface formed by an ellipsoid, a light source disposed at a focal position of the first reflector, a second reflector opposed to the first reflector and having a reflecting surface formed by a spherical surface centered about the focal position, the second reflector having an opening on an optical axis extending from the light source to the liquid crystal panel, a concave lens has disposed at the opening of the second reflector on the optical axis for refracting light emanating from the light source and reflected from the first reflector, toward an image display portion of the liquid crystal panel, the concave lens having an aperture sufficiently smaller than the image display portion of the liquid crystal panel and a focus positioned closer to the liquid crystal panel than the position of a second focus, closer to the liquid crystal panel, of the ellipsoid forming the reflecting surface of the first reflector, and a convex lens being interposed between the concave lens and the liquid crystal panel for converting light emanating from the concave lens to parallel rays.

4. A light source device as defined in claim 3 wherein the concave lens has at least one surface formed by a multi-focus curved surface or an aspherical surface to suppress spread of light due to an aberration of the lens.

5. A light source device for use in a liquid crystal projector comprising a reflector oriented toward a liquid crystal panel and having a reflecting surface formed by a paraboloid, a light source disposed at the focal position of the reflector, and an optical plate disposed ahead of an opening of the reflector, the optical plate having a multiplicity of microlenses arranged on the surface thereof on the liquid crystal panel side and a light reflecting surface on the light source side, a multiplicity of light passing windows being formed at the positions of foci of the respective microlenses.

* * * * *